United States Patent [19]

Borgqvist

[11] 4,030,672

[45] June 21, 1977

[54] PROCESS AND AN APPARATUS FOR PRODUCING FLUFFED FIBER MATERIALS

[75] Inventor: Lennart Rickard Borgqvist, Oxie, Sweden

[73] Assignee: Kamas Industri Aktiebolag, Malmo, Sweden

[22] Filed: Jan. 27, 1976

[21] Appl. No.: 652,690

[30] Foreign Application Priority Data

Jan. 31, 1975 Sweden .............................. 7501080

[52] U.S. Cl. .................................. 241/18; 241/28; 241/51; 241/73; 241/186.1; 241/189 R
[51] Int. Cl.² ................................ B02C 13/286
[58] Field of Search ................ 241/18, 27, 28, 51, 241/58, 73, 86.2, 89.3, 186 R, 186.1, 189 R

[56] References Cited

UNITED STATES PATENTS

| 1,013,611 | 1/1912 | Peters ................................. 241/73 |
| 1,258,969 | 3/1918 | Williams ............................. 241/51 |
| 1,973,074 | 9/1934 | Howes, Jr. et al. ................ 241/51 |
| 3,771,733 | 11/1973 | Hadley et al. ...................... 241/73 |

Primary Examiner—Granville Y. Custer, Jr.
Attorney, Agent, or Firm—Jones, Tullar & Cooper

[57] ABSTRACT

A process for defibrating cellulosic materials into fluffed materials wherein blocks and at least one strip of cellulosic fibrous materials are continuously fed into a defibration unit where they are simultaneously disintegrated in a dry state upon contact with impact elements which are pivotably mounted on a rotor, fluffed and mixed by the impact elements so as to form a homogeneous mixture of fluffed materials.

An apparatus for performing the process which comprises a defibration unit provided with separate feed units for blocks and strips of cellulosic fibrous materials and a rotor having pivotably mounted impact elements which disintegrate, fluff and mix the entering feed materials. The mixture is discharged through a sieve located in the bottom of the defibrating unit.

The position of the entering feed blocks on a feed plate is maintained within angle limits to prevent blocks from being uncontrollably pulled into the defibration unit.

16 Claims, 3 Drawing Figures

PROCESS AND AN APPARATUS FOR PRODUCING FLUFFED FIBER MATERIALS

The present invention relates to a process and an apparatus for producing fluffed fiber materials from dried cellulosic fibrous materials by defibration.

It is previously known to produce fluffed fiber materials from cellulosic materials in the form of a strong strip wound into a roll, said materials preferably comprising chemical pulp. An apparatus of this kind is described in the Swedish Patent No. 339,909, which relates to an apparatus for disintegrating dried, cellulosic fibrous materials. The apparatus has a rotor disposed in a housing and has several impact elements permanently mounted on the rotor and ending in tips, the distance between the tips of the impact elements and a sheet support disposed in the housing lying within a predetermined interval in dependence of the thickness of the sheet materials.

The Swedish Pat. No. 335,469 discloses, in connection with a machine for separating sheets from a bale of sheets of pulp, an apparatus for disintegrating the sheets. This apparatus comprises a cutter having impact knives permanently mounted on an axle which cut the sheets fed into the cutter to small pieces hich are fed to an apparatus for further disintegration and defibration.

An apparatus for tearing compressed fiber material in the form of a bale is previously known which comprises a rotatable toothed shredding cylinder for shredding the blocks constituting a bundle to form pieces or shreds having substantially equal size which are intended to be supplied to conventional disintegrating and defibrating machines.

From the above description of prior art for producing fluffed fiber materials from cellulosic material it appears that it is previously known to defibrate cellulosic material in one single from at a time. Thus, there are machines for defibrating cellulosic material in the form of strips wound into a roll or sheets or bales composed of several sheets.

In most known apparatuses the defibration takes place in two steps, i.e. in two machines disposed one after the other, the cellulosic material being first disintegrated in one machine into smaller pieces, which are supplied to the other machine for final defibration.

However, according to the Swedish Pat. No. 339,909 the defibration of the cellulosic material takes place in one step. The apparatus disclosed therein has a defibration unit which is only suited for cellulosic material in strip form.

A problem existing in all known defibration units is that the processing elements of the defibration unit in processing the materials fed into said unit exert a force on the material in the feed direction, whereby the material can be pulled into the defibration unit in an uncontrolled way and create unfavourable processing conditions and even cause clogging in the defibration unit.

In defibrating materials in the form of strips from a roll this problem is solved by the measure that the force exerted on the strip by the defibration unit is counteracted by a pulling force oppositely directed in the continuous strip.

In feeding sheets and blocks into a defibration unit the problem involving the drawing force acting on the material to be processed is solved by disposing particular feeding rolls and/or holding elements for the purpose of counteracting said force. Thus, a pair of clamping means disposed close to the shredding cylinder of the defibration unit and disposed on each side of the conveyor for the bales can be provided in connection with the defibration unit. These and other similar means previously known for clamping the fed material have however too complicated construction and control to be able to operate continuously during the feeding stage.

Furthermore, it is known from the German Pat. No. 613,770 to defibrate dried cellulosic pulp in the form of blocks by working the softened pulp by means of impact elements while water is being supplied in order to soften the compact pulp. A remarkable drawback in that connection is that the fluffed pulp obtained must be dried before it can be used as a filling material in diapers nd other sanitary articles.

Since blocks of preferably mechanically produced cellulosic fibrous material occur on the market there is a great need for being able to produce fluffed fiber materials from such blocks in a simple manner. The fluffed material obtained is used essentially for sanitary products and as fillers in the plastics and chemical industries.

The object of the invention is to suggest process and a device for producing fluffed materials in a single stage from dried cellulosic materials in various forms.

Another object of the invention is to permit mixing of fibrous materials deriving from several forms of cellulosic materials, said mixing operation taking place in one and the same processing stage.

Yet another object of the invention is to suggest such means that in defibrating cellulosic materials the defibration unit will not exert any drawing power on the blocks of cellulosic materials fed into the machine.

The above objects are achieved by means of a process of the kind mentioned by way of introduction which is characterized according to the invention in that blocks of preferably mechanically produced cellulosic materials and strips from a roll of preferably chemically produced cellulosic materials and possibly mechanically or chemically produced cellulosic materials in sheet form are continuously fed into a defibration unit.

By the expression "fluffing" which is used in the present connection is meant a processing of the cellulosic fibrous materials into a dispersion of individual or essentially individual fibers in air.

By the expression "a block" is meant in the first place bodies of compressed materials of parallelepipedic shape.

Even if it has been mentioned above that the installation according to the invention is used in connection with cellulosic materials it will be apparent from a study of the subsequent description that the installation can also be utilized for any kind of disintegratable material.

The invention will be described in greater detail with reference to the accompanying drawing of a preferred embodiment of an installation according to the invention for disintegrating and fluffing cellulosic fibrous materials, thus:

Figure 1:
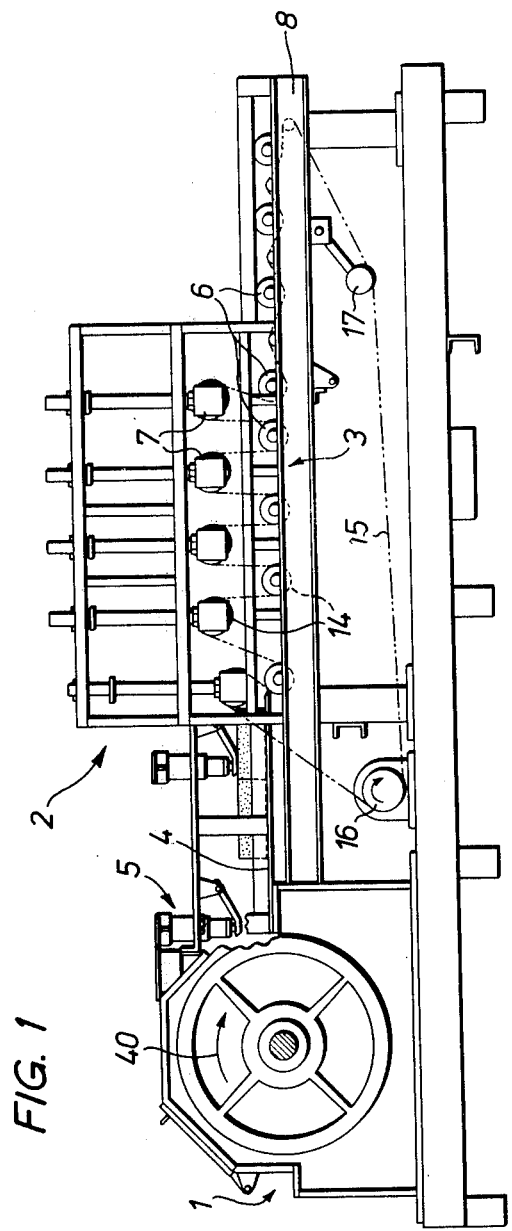
FIG. 1 shows an installation of this kind, partly in lateral projection and partly in an oblique side elevation.
Figure 2:
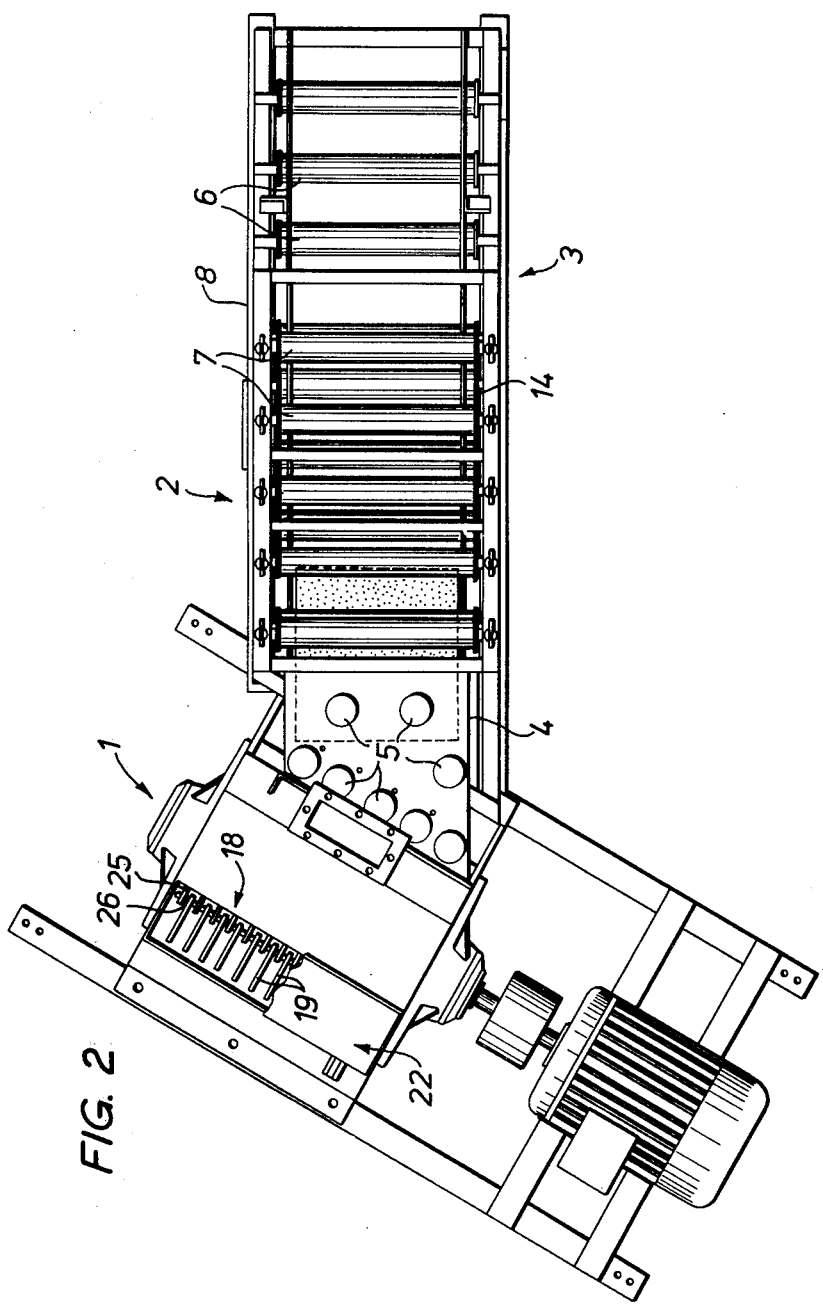
FIG. 2 shows the installation shown in FIG. 1 according to the invention in a real vertical projection.

An installation according to the invention for defibrating cellulosic fibrous materials into at least block shape comprises essentially two units, a defibration unit 1 and a feed unit 2 disposed in front of the former unit and shown to the left and to the right in FIGS. 1 and 2, respectively.

The blocks, whose dimensions are approximately 800 × 600 × 100 mm, usually consist of mechanically produced fibrous cellulosic materials, FIG. 2 shows two blocks.

The feed unit 2 is composed of one drivable conveying means 3 on which blocks having one and the same parallelepipedic shape are fed from a stock (not shown) in a continuous sequence to the defibration unit 1, and a feed plate 4 disposed between the defibration unit 1 and the feed unit and having spring assemblies 5 disposed above the plate for frictionally clamping the blocks against the feed plate when the blocks are fed into the defibration unit 1.

The conveying means comprises an upper and a lower roller assembly mounted on a frame 8 and having rotatably journalled lower and upper rollers 6 and 7, respectively. At one side of the conveying means all rollers are provided at their axle ends fo their driving with sprockets 14 co-operating with an endless chain 15 which is driven by means of a driving device 16 and is kept tensioned by means of a diagrammatically shown chain tensioning assembly 17.

The defibration unit which will be described in more detail below essentially consists of a hammer mill having a rotor 18 provided with impact elements 19 for processing the blocks fed into the unit. The defibration unit 1 is disposed in such a way in relation to the feed unit 2 that the feed direction forms an angle with the rotor axle different from 90°, preferably 30° to 60°. The dvantage of this will be apparent from the following description.

Above the feed plate 4 there are fixed the previously mentioned spring assemblies 5 in the frame 8 for frictional clamping of the blocks against the feed plate 4 during the feeding of the blocks into the defibration unit and at their working by means of the impact elements 19 of the rotor. The spring assemblies 5 are in the first place meant to press the blocks against the feed plate 4 during the processing operation so that these will rest securely thereagainst along their entire length and will not tip into the defibration unit.

The number of spring assemblies 5 is arbitrary but a number of eight is preferred, five of which are located in a straight line immediately adjacent the defibration unit. Of the remaining three spring assemblies two are symmerically disposed at right angles to the feed direction in connection with the discharge end of the conveying means 3, while the third assembly is located at the parallel side of the feed plate 4 which is largest and essentially in the middle of that side.

The various spring assemblies 5 may be embodied in an arbitrary manner as long as they are adapted to apply a force pressing a block fed into the defibration unit against the feed plate 4.

The defibration unit 1 is as mentioned above essentially in the form of a hammer mill having a rotor 18 rotatably mounted in a housing 22 and having a chamber 24 for discharging fluffed materials which is disposed below the housing and separated from the interior of the housing by a sieve 23. The rotor comprises discs 25 of circular peripheral shape axially and evenly spaced around a central rotor axle. Some distance inside the peripheral margins of the discs there are disposed spindles 26 in parallel with the rotor axle along the whole rotor and evenly spaced around its periphery. Around the said spindles there are disposed between adjacent discs link mounted impact elements or hammers 19 which consist of freely pivotable bars of such a length that at the rotation of the rotor when they are thrown outwardly toward the walls of the housing due to the influence of the centrifugal force they will form a small gap between their outer ends and the walls of the housing.

The housing has a lower, essentially semicylindrical wall 28 which is largely covered with the previously mentioned sieve 23 through which defibrated materials will fall down into the underlying chamber 24. The upper margin of the semi-cylindrical wall facing the feed unit is essentially disposed in a horizontal plane through the central line of the rotor axis and is provided with an abutment plate 29 located above the margin and intended for blocks fed into the unit. The abutment plate is part of the feed plate and its upper surface is located above a horizontal plane through the center line of the rotor axis and adjoins the upper surface of the feed plate 4 in plane therewith. In this case it is presupposed that the rotor of the hammer mill has the rotational direction which is indicated by an arrow 40 in FIG. 3 so that at the operation of the mill the free ends of the various impact elements 19 will first pass the feed opening for blocks and will then pass through an imaginary extension of the feed plate 4. The reason for this will become apparent below.

Figure 3:
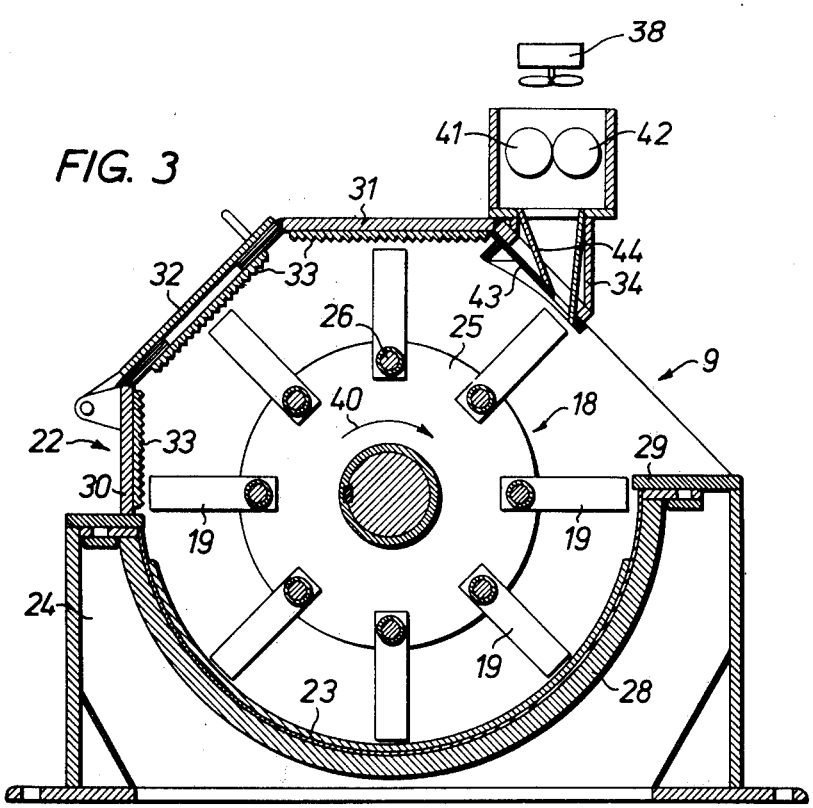
FIG. 3 is a cross-sectional view through a defibration unit which is part of the installation according to the invention and shown in FIGS. 1 and 2.

As shown by the cross section shown in FIG. 3 of an embodiment of a defibration unit, the entry opening 9 in the housing of the rotor 22 is shown to the right above the abutment plate 29 while at the opposite side of the housing, in connection with the semicylindrical wall, a plane, essentially vertical wall portion 30 extends along the rotor 18. The upper portion of the housing is also made as an elongated plane wall portion 31 along the entire housing. Between the upper wall portion 31 and the vertical wall portion 30 there is disposed a plane inspection door 32 extending essentially along the entire housing and having sealing engagement with flanges attached to the two wall portions. The two plane wall portions 30 and 31 and the door 32 are provided on its sides facing the interior of the housing with exchangeable shredding segments 33 serving to disintegrate further major pieces of fibrous material by co-operating with the impact elements 19.

At that side of the upper plane wall 31 of the housing which faces the entry opening 9 there is fixed a connection piece 34 having a rectangular cross-section and disposed in an equally elongated plane wall portion. Through this connection piece air flows, possibly propelled by means of a fan 38, in order to increase the pressure in the housing of the defibration unit in order to facilitate the removal of fibrous material through the sieve 23 in the lower portion of the housing, and in order to cool the rotor and preferably its impact element 19 and the mounting locations thereof.

The chamber 24 which is located beneath the rotor housing 22 serves to collect fibrous materials discharged through the sieve, said materials having obtained the desired disintegration and being dischargeable in the nature of a fluffy rug through a pipe for immediate use without additional treatment.

In connection with the said discharge pipe there is also a fan which is adapted to inhale air from the defibration unit, whereby a satisfactory air flow will be obtained through the sieve for conveying the fluffed materials.

A sensing means disposed at the discharge pipe from the chamber senses the thickness of the discharged rug and gives off a guiding signal in dependence on a desired magnitude to a control means for changing the feed rate of the feed unit, whereby the desired thickness of the discharged rug can be obtained.

The rotor, which is rotatably mounted in the side walls of the housing 22, is operated by means of a driving means and has such a rotational direction that its upper portion is displaced towards a block fed into the defibration unit, while its lower portion is displaced away therefrom. As a consequence of this, and of the fact that the feed plate 4 and the abutment plate 29 are located above a horizontal plane through the symmetry axis of the rotor the power in the tangential direction of the rotor applied by the impact element 19 of the rotor to a block fed into the unit during the processing operation will give rise to a component force opposite to the feed direction. This may be expressed in more general terms by stating that a feed plate provided in connection with the defibration unit and forming part of the feed unit is disposed in parallel with the axis of the defibrating unit although above a plane through said axis. The rotor is adapted to rotate with such a directional rotation that the angle formed between the radius from the center of the rotor to the free margin of the feed plate and the radius from the center of the rotor to the free end of the impact element, as the impact element performs work on a block is decreasing constantly. In other words, the impact elements rotate so as to force the block being impacted against the feed plate, thus causing a force vector against the feed direction, preventing the block from being uncontrollably pulled into the defibration unit. Due to this force acting on a fed-in block against the feed direction it is ensured that the blocks are fed into the unit only by means of the feed force transmitted by means of the feed unit onto the blocks and the blocks are prevented from being drawn in an uncontrolled manner in the defibration unit, in particular when small portions of a worked block remain.

In the described embodiment of the machine according to the invention it is presupposed that the feed plate 4 is horizontal and that the blocks are fed into the defibration unit lying on the feed plate. However, the feed plate may also form an angle to a horizontal plane. As the essential characteristic of the machine when blocks of cellulosic pulp are fed into it, is that a force directed against the feed direction of the blocks is applied to a block by the impact elements throughout the time during which it is worked, a still more general criterion may be posed for this purpose. Thus, in addition to the said demand for a rotational direction, the feed plate is to adjoin the defibration unit in such a way that its imaginary extension falls within the right angle formed between on one hand a radius from the symmetry axis of the rotor to the line of intersection formed by the extension of the feed plate with the cylinder surface generated by the free ends of the impact elements at the rotation of the rotor, and on the other hand a tangent drawn from the said line of intersection in the direction of movement of the impact elements.

As mentioned before, the defibration unit is located in such a way that its rotor axis forms an angle of preferably 30° to 60° to the feed direction. As a consequence of this, a new block fed into the defibration unit will be worked beginning from a corner margin. In the same way there remains at the end of the working of the block only a gradually diminishing corner portion and since the blocks follow each other continuously without interspaces, working of a subsequent block corner portion begins before the first block has been subjected to final working. As a consequence of the oblique feeding a continuous transition between successive blocks are obtained when the rotor works a block and an even feed of blocks is ensured. In addition, the jerks occurring at the transition between successive blocks which are difficult to avoid and which will appear when there is a feed at right angles to the rotor axis are eliminated. Due to angled feed, there will be no rinds and residuals of the blocks. Such rinds and residuals would be obtained when blocks are fed onto the defibration unit at a substantially right angle to the rotor of the defibration unit and cause problems, since the rinds and residuals may be controllably pulled into the defibration unit in view of the fact that they are difficult to clamp against the feed plate.

The connection piece 34 provided on the upper side of the housing is utilized not only in order to supply air but also in order to feed cellulosic materials in strip form from a roller to the defibration unit for disintegration and fluffing through actuation by the impact elements of the rotor simultaneously with defibration of cellulosic material in block form. In addition, return materials, i.e. imperfectly disintegrated pulp obtained during test running and starting of the machine, may be fed into the machine through the connection piece 34. As the cellulosic materials in block shape preferably consist of mechanically produced cellulosic materials and since the cellulosic materials in roller shape, is preferably in the nature of chemically produced cellulosic material, it is possible when these two kinds of materials are defibrated simultaneously to obtain a mixture of chemically and mechanically produced cellulosic material in desired proportions.

In the connection piece 34 there are provided two driven rollers 41 and 42 between which the strip shape cellulosic pulp is adapted to be fed into the defibration unit. At that end of the connection piece 34 which opens into the defibration unit there is provided, upstream in the rotational direction, a blocking plate 43 which ensures that the air flow generated by the rotor has a minimum effect on the strip of cellulosic pulp fed into the unit through the connection piece. A blocking plate 43 partly covers the rectangular opening of connection piece towards the defibration unit, said plate extending from the upper portion of the connection piece and ending in a free end spaced from the lower portion of the opening. Thereby a narrow feed-in opening is created. In addition there is at one longitudinal side of the connection piece 34 a first guiding plate 44 for guiding the strip in the connection piece, the guiding plate forming, together with a second guiding plate located at the opposite longitudinal side of the connection piece, forming a space tapering downwardly towards the feed opening.

Furthermore, at the left-hand side of the housing of the defibration unit, e.g. instead of the inspection door 32, there may be provided a detachable feed unit for chemically or mechanically produced cellulosic material in sheet form, whereby an additional possibility is provided for obtaining a fiber mixture in the desired proportions and a possibility is obtained for utilizing cellulosic material of yet another kind in the installation. If it is desired to avoid the drawing force generated at the working of the materials fed into the defibration unit there is provided at the feed unit for sheets a feed plate preferably in the same way as the feed plate for blocks, the sheets to be adjoined to an upper supporting surface of the feed plate. In such a case the feed plate for sheet material must in such a case be located with its supporting surface above a plane through the symmetry axis of the defibration unit.

When the installation is in operation blocks are fed from a magazine through the feed end of the conveying means 3 and are conveyed forward by means of the first lower roller 6 at certain speed v. At the discharge end of the conveying means 3 the blocks are pressed one after one out onto the feed plate 4 by being pushed on by successive blocks in the conveying means. Since the blocks are clamped against the feed plate 4 by means of the spring assemblies 5 there is required in order to feed the blocks a driving power transmitted via the sequence of blocks and applied to a block clamped against the feed plate, said force being greater than the sum total of the friction power acting on the block and the power generated by means of the impact elements at the working of a block and directed against the feed direction and applied to the block.

The blocks are fed into the defibration unit with their front end at an angle to the rotor axis and will consequently be worked from a corner by means of the impact elements of the rotor. The working surface will increase successively during the feeding operation unit the next block enters with its first corner into the defibration unit, when the working surface of the block decreases successively accordingly as the working surface of the next one increases.

The feed rate of the blocks into the defibration unit is adjusted to the capacity of the defibration unit and the nature of the blocks. When the blocks consist of mechanical cellulosic materials having a size of approximately 800 × 600 × 100 mm it has proved suitable to feed the blocks 0.2 mm for each set of impact elements hitting a block fed into the unit. One set of impact elements 19 after the other will hit the working surface of the block at the rotation of the rotor and will strike or shred away small pieces of fibrous material from the block. The small pieces and shreds are wipped around in the rotor housing by the impact elements 19 and are shredded into single or essentially single fibers through co-operation between the impact elements 19 on one hand and the sieve 23 and the shredding segments 33 on the other. Since the impact elements 19 are freely movable around the spindles 26 they will act yieldingly on a fed block during the working operation, whereby essentially cutting action on a fed block and the breaking away of minor pieces is avoided so that the fibers will largely retain their original length.

The air flow introduced through the connection piece 34 into the housing 32 accelerates the discharge of defibrated materials through the sieve 23 to a fluffy composition.

Strips of cellulosic material from a roller are fed through the connection piece 34 to the defibration unit 1 simultaneously as the rotor 18 works the blocks. This is possible since a strip of cellulosic materials does not present any great resistance to the impact elements 19 during the actuation by means of these but the impact elements will deviate insignificantly from their radial direction so that during their continued rotational movement up to a block fed into the housing through the entry opening 9 they will largely assume their radial direction, whereby they will work the block almost independently of the previous working of the strip of cellulosic material.

The entry opening which is meant for feeding strips of cellulosic material from a roller to the defibration unit may also be disposed in basically the same way as the feed opening for blocks even if this is not required. The drawing also shows the connection piece 34 disposed in a conventional manner. Since the fluffing of cellulosic material in strip shape and in block shape takes place simultaneously in the same apparatus, the fibers obtained from the strip and from the block will be mixed so as to form a homogenous mixture. Due to the fact that chemical cellulosic material occurs in strip shape and mechanical cellulosic material in block form a combination of mechanical and chemical cellulosic material may be obtained in arbitrary proportions. The proportions of the various forms of materials in the mixture may be varied by varying the feed rate to the rotor for strips and blocks.

By means of the machine according to the invention the fluffed cellulosic pulp is obtained in a dried state, permitting it to be used directly as a filler in diapers and other sanitary products.

As mentioned previously, cellulosic materials in the nature of sheets or blocks of sheets may be supplied to the defibration unit by providing a feed unit for sheets at the defibration unit at the position for the inspection door.

The invention has been described with reference to a preferred embodiment but it is self-evident that a great number of alternative and modified embodiments may occur, all of which fall within the scope of the invention as defined by the appended claims.

I claim:

1. A process for providing fluffed fibrous material from cellulosic, in particular fibrous materials, by defibration, the process comprising feeding both blocks of cellulosic materials and at least one strip of cellulosic materials from a roll continuously into a defibration unit, disintegrating said blocks and strips in a dry state by means of yielding impact elements mounted on a rotor, the disintegrated material thus obtained being fluffed and mixed so as to form a homogenous mixture, and discharging said mixture through a sieve.

2. A process as claimed in claim 1, wherein air is introduced through a connection piece into the defibration unit to increase the pressure in the interior of the defibration unit thereby facilitating the conveyance of the fluffed materials through and out from the defibration unit, and to simultaneously cool the defibration unit.

3. A process as claimed in claim 1, wherein said strip of cellulosic material is fed to the defibration unit through a connection piece carried by the defibration unit, said connection piece also being utilized for introducing air into the defibration unit.

4. A process for providing fluffed fibrous material from cellulosic, in particular fibrous materials, by defibration, wherein blocks of cellulosic materials are fed continuously into the defibration unit for disintegration and fluffing by means of freely pivotable impact elements mounted on a rotor, so as to form a homogenous mixture of fluffed fibrous materials which is discharged through a sieve, wherein a force is applied to said blocks upon being worked by said impact elements and said force is in a direction opposite to the feed direction of said blocks.

5. A process as claimed in claim 4, wherein a strip of cellulosic material also is fed to the defibration unit for disintegration, fluffing and mixing therein through a connection piece carried by the defibration unit, said connection piece also being utilized for introducing air into the defibration unit.

6. A process for providing fluffed fibrous material from blocks of cellulosic, in particular fibrous materials by defibration, utilizing a defibration unit having freely pivotable impact elements mounted on a rotor, said process comprising feeding said blocks to the defibration unit along a feed plate connected to said unit and supporting said blocks, wherein an imaginary extension of the surface of said feed plate on which the blocks are fed into the defibration unit, falls within the right angle formed between a radius from the symmetry axis of the rotor through the point of intersection formed by said imaginary extension of the feed plate with a cylinder surface generated by the free ends of said impact elements, and a tangent drawn from said line of intersection in the direction of rotation of said impact elements, and giving said rotor such a rotational direction that the angle formed between the said radius and a line from the symmetry axis of said rotor through the free margin of said feed plate decreases continuously during the performance of work by said impact elements upon said blocks.

7. A process as claimed in claim 6, wherein said feed plate is horizontally located above a horizontal plane through the symmetry axis of the rotor.

8. A process as claimed in claim 6, wherein said blocks are fed to the defibration unit at an angle different from 90° to the axis of the rotor which is part of the defibration unit.

9. A process as claimed in claim 6, wherein said blocks are fed to the defibration unit at an angle between 30° and 60° to the axis of the rotor.

10. Apparatus for providing fluffed fibrous material from cellulosic, in particular fibrous materials, be defibration, comprising a defibration unit provided with a rotor therein, said defibration unit comprising separate feed units for continuous feeding of blocks of cellulosic materials and at least one strip of cellulosic materials from a roll into said defibration unit, and separate discharging means comprising a sieve for discharging fluffed materials from said defibration unit, the rotor comprising pivotally mounted impact elements for disintegration, fluffing and mixing of said blocks and said strip in a dry state and for discharging a dry mixture obtained of fluffed materials from said blocks and strip through said discharge means.

11. Apparatus as claimed in claim 10, comprising a connection piece for introducing air into the defibration unit in order to convey the fluffed materials through the defibration unit and out through the sieve and simultaneously to cool the defibration unit.

12. Apparatus as claimed in claim 10, wherein the feed unit for strips is provided in the connection piece for supplying air into the defibration unit.

13. Apparatus for providing fluffed fibrous materials from blocks of cellulosic, in particular fibrous materials, by defibration, comprising a defibration unit having mounted therein a rotor with pivotally journalled impact elements for disintegrating said blocks which can be supplied to the defibration unit along a feed plate, said feed plate being connected to the defibration unit, an imaginary extension of the supporting surface of said feed plate on which said blocks are to be fed into the defibration unit falling within a right angle formed between a radius from the symmetry axis of said rotor through the line of intersection formed by said extension of said feed plate with the cylinder surface which is generated by the free ends of said impact elements, and a tangent drawn from the line of intersection in the direction of rotation of said impact elements, and said rotor being rotated in such a direction that the angle between said radius and a line from the symmetry axis of said rotor through the free margin of said feed plate decreases continuously during the working of said blocks.

14. Apparatus as claimed in claim 13, wherein said feed plate is horizontal and lies above the horizontal plane through the symmetry axis of said rotor.

15. Apparatus as claimed in claim 13, wherein said feed plate is arranged for feeding said blocks to the defibration unit at an angle different from 90° in relation to the axis of said rotor.

16. Apparatus as claimed in claim 15, wherein said feed plate is provided for feeding said blocks to the defibration unit at an angle between 30° and 60° in relation to the axis of said rotor.

* * * * *

UNITED STATES PATENT AND TRADEMARK OFFICE
CERTIFICATE OF CORRECTION

PATENT NO. : 4,030,672
DATED : June 21, 1977
INVENTOR(S) : Lennart Rickard Borgqvist It is certified that error appears in the above—identified patent and that said Letters Patent are hereby corrected as shown below:

In Claim 10, line 2, before "defi-", "be" should be --by--.

Signed and Sealed this

Eleventh Day of October 1977

[SEAL]

Attest:

RUTH C. MASON
Attesting Officer

LUTRELLE F. PARKER
Acting Commissioner of Patents and Trademarks